Patented Dec. 29, 1925.

1,567,610

UNITED STATES PATENT OFFICE.

RICHARD MOLDENKE, OF WATCHUNG, NEW JERSEY, AND WILHELM SCHUMACHER, OF BERLIN, GERMANY; SAID SCHUMACHER ASSIGNOR TO SAID MOLDENKE.

PROCESS OF MAKING ALUMINUM SULPHATE FROM ALUMINOUS MATERIALS.

No Drawing. Application filed January 10, 1923. Serial No. 611,844.

*To all whom it may concern:*

Be it known that we, RICHARD MOLDENKE and WILHELM SCHUMACHER, citizens of the United States and Germany, respectively, and residing at Watchung, county of Somerset and State of New Jersey, United States of America, and at Berlin, Germany, respectively, have invented a certain new and useful Improvement in Processes of Making Aluminum Sulphate from Aluminous Materials, of which the following is a specification.

This invention is a process of making aluminum sulphate from aluminous materials such as bauxite, kaolin, clay and the like in an efficient and economical manner.

It has heretofore been the practice to make aluminum sulphate from such materials by subjecting them to the action of sulphuric acid in the presence of heat. The usual practice has been to mix sulphuric acid with the material and thereafter heat the mixture in an open chamber to a sufficiently high temperature to effect the conversion desired. This prior process, however, has the disadvantage of leaving the silica in a jelly-like form making it difficult to separate from the aluminum hydrate. Moreover, a further and more serious disadvantage resides in the fact that there are usually considerable quantities of iron compounds present in the mineral materials under treatment. This iron takes the form of iron sulphate which can only be completely separated from the aluminum sulphate by tedious and costly processes.

In the present process these disadvantages are overcome in a simple and thoroughly practical manner.

In the preferred manner of practicing this invention the mineral material to be treated is subjected to sulphuric acid, in the presence of a temperature above the boiling point of the acid. An excess of sulphuric acid over and above that required to effect complete conversion of the aluminous materials present is preferably used and a temperature of between 600 and 700 degrees Fahrenheit will generally give good results. This temperature being above the boiling point of sulphuric acid results in the production of sulphuric acid vapors and the operation is conducted in a closed receptacle.

Any suitable temperature may be employed, depending upon conditions, but at these temperatures sulphuric acid will act upon any ferrous oxide which may be present but will have practically no effect upon ferric oxide. Accordingly, air is preferably introduced into the treating chamber during conversion in order that it may oxidize the ferrous oxide which may be present and change it into ferric oxide. When conversion is effected in the manner described, it is found that, while soluble aluminum sulphate is readily formed, the iron which was present in the materials treated will be maintained in an insoluble form and may be readily separated out by subsequent leaching.

The process may be economically practiced by adding another step which consists in taking the aluminum sulphate which results from the treatment described and calcining it in a furnace or retort at a suitable temperature, say 1000 degrees Fahrenheit. The vapors of sulphuric acid which are driven off during calcining may be returned to and fed, together with air, into the conversion chamber to act upon the heated material therein. A saving of sulphuric acid is thereby obtained as the acid is repeatedly used.

It will, of course, be understood that in carrying out this phase of the process, additional sulphuric acid may be added to the vapors recovered in order that sufficient vapors may at all times be present to assure complete conversion.

Having thus fully described the invention, what we claim as new and desire to secure by Letters Patent, is:

1. The process which consists in subjecting heated aluminous material to the action of sulphuric acid vapors, to produce aluminum sulphate, and introducing air to oxidize the iron contained in such material so that it will not be appreciably acted upon by the sulphuric acid.

2. The process which consists in subjecting aluminous materials to the action of sulphuric acid vapors and air while maintaining a temperature above the boiling point of sulphuric acid and above the temperatures at which the sulphuric acid will appreciably act upon ferric oxide.

3. The process which consists in subjecting aluminous materials to the action of sulphuric acid vapors and air while maintaining a temperature of between 600 and 700 degrees Fahrenheit.

4. The process which consists in subjecting aluminous materials to the action of sulphuric acid vapors to produce aluminum sulphate, in the presence of air to oxidize the iron contained in said materials, thereafter leaching out the aluminum sulphate, thereafter calcining the aluminum sulphate to drive off sulphuric acid vapors therefrom, and utilizing such acid vapors to treat further aluminous materials.

5. The process which consists in subjecting aluminous materials to the action of sulphuric acid vapors and air to produce aluminum sulphate, then leaching out the aluminum sulphate, thereafter calcining the aluminum sulphate to drive off sulphuric acid vapors therefrom, and utilizing such acid vapors to treat further aluminous materials.

6. The process which consists in subjecting aluminous materials to the action of sulphuric acid vapors and air while maintaining a temperature above the boiling point of sulphuric acid and above the temperatures at which the sulphuric acid will appreciably affect ferric oxide, for the purpose of producing aluminum sulphate, then leaching out the aluminum sulphate thereafter calcining said aluminum sulphate to drive off sulphuric acid vapors therefrom, and utilizing such vapors with further air to treat additional aluminous materials.

In testimony whereof we have signed the foregoing specification.

RICHARD MOLDENKE.
WILHELM SCHUMACHER.